United States Patent
Umeki et al.

(10) Patent No.: US 7,035,853 B2
(45) Date of Patent: *Apr. 25, 2006

(54) DOCUMENT MANAGEMENT METHOD AND DOCUMENT MANAGEMENT DEVICE

(75) Inventors: Hideo Umeki, Kawasaki (JP); Nobuhiro Shimogori, Kawasaki (JP); Kouichi Sasaki, Kawasaki (JP); Mika Fukui, Tokyo (JP); Yasuko Nakayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 730 days.

This patent is subject to a terminal disclaimer.

(21) Appl. No.: 09/984,712

(22) Filed: Oct. 31, 2001

(65) Prior Publication Data

US 2002/0052920 A1 May 2, 2002

(30) Foreign Application Priority Data

Oct. 31, 2000 (JP) .............................. 2000-333915

(51) Int. Cl.
*G06F 17/30* (2006.01)
(52) U.S. Cl. .......................................... 707/8; 707/102
(58) Field of Classification Search .................... None
See application file for complete search history.

(56) References Cited

U.S. PATENT DOCUMENTS 6,339,774 B1   1/2002   Nakayama et al.

OTHER PUBLICATIONS

U.S. Appl. No. 09/984,712, filed Oct. 31, 2001, Umeki et al.
U.S. Appl. No. 10/384,603, filed Mar. 11, 2003, Umeki et al.
U.S. Appl. No. 09/984,712, filed Oct. 31, 2001, Pending.
U.S. Appl. No. 09/984,715, filed Oct. 31, 2001, Pending.

*Primary Examiner*—Safet Metjahic
*Assistant Examiner*—Sana Al-Hashemi
(74) *Attorney, Agent, or Firm*—Oblon, Spivak, McClelland, Maier & Neustadt, P.C.

(57) ABSTRACT

Editing contents for the editing-object document selected from the plural documents that are inputted from the terminal devices connected to the network and that can be owned jointly via the network and corresponding message sentences for the editing contents are received, and a new renewed document is prepared by renewing the editing-object document on the basis of the editing contents, while extracting the renewed contents of the editing-object document by comparing the editing-object documents before and after the renewal with each other, storing at least the renewed contents as the history concerning the renewal of the editing-object document after preparing the contents correspondence with the message sentences, and displaying the renewed contents with the message sentences at a request by the user on the terminal device that sent the request.

14 Claims, 15 Drawing Sheets

| Sort of editing operation<br>Document identification information | New preparation | Replacement/addition | Deletion |
|---|---|---|---|
| Not designated | ○<br>(Newly issue document identification information) | × | × |
| The same document identification information exists in the same message tree | × | ○ | ○ |
| The same document identification information exists in the other message tree or outside | ○<br>(Start document observation) | × | ○<br>(Suspend document observation) |

FIG. 10

```
                                                        600
                                                        /
                      Message display 601 —— Message ID : Message-ID1236

602 —— Preparing person : Ichiro Tanaka

603 —— Title : Re : The minutes of previous meeting

604 —— Reference message : Message-ID1234

605 —— ┌─────────────────────────────────────────────┐
       │ Yamada wrote :                              │
       │ > I prepared a document of the minutes of the│
       │   previous meeting.                         │
       │                                             │
       │ Development language determined at the meeting is│
       │ not c, but c++ so I revised the concerned parts.│
       └─────────────────────────────────────────────┘

611 —— Document ID : Doc-ID403 (whole sentences) rev.2
612 —— Title       : The second minutes (Sep. 03)
       Renewal information :

613 —— ┌─────────────────────────────────────────────┐
       │ A part is revised as below.                 │
       │                                             │
       │ 8c                                          │
       │ <-c is determined for prototype development │
       │ >-c++ is determined for prototype development│
       └─────────────────────────────────────────────┘
```

FIG. 15

```
                                                            700
                                                             )
┌─────────────────────────────────────────────────────────────┐
│                    Document display                         │
│                                                             │
│ 701──Document ID : Doc-ID403 (rev.2:latest version)         │
│                                                             │
│ 702──Title :  The second minutes (Sep. 03)                  │
│                       ┌──────────────────────┐ ┌──────────────────┐
│ 703──Revision :       │ ◄ to previous version│ │ to next version ►│
│                       └──────────────────────┘ └──────────────────┘
│                                                             │
│ 704──[✓] Display difference with previous version           │
│                                                    706      │
│                         ┌──────────────┐ ┌────────────────┐ │
│ 705──Corresponding message:│Message-ID1234│ │ Jump to message│ │
│                         └──────────────┘ └────────────────┘ │
│      ┌──────────────────────────────────────────────────────┐
│ 710──│ The second meeting minutes                           │
│      │                                                      │
│      │ Time and date : Aug. 30/2000, 10:00-12:00            │
│      │ Place : The 3rd meeting room                         │
│      │ Participant : Yamada, Suzuki, Sato, Tanaka (clerk)   │
│      │                                                      │
│      │ • Development language of A project                  │
│      │   -c++ is determined for prototype development.      │
│      │   ─────────────────────────────────────────          │
│      │                                          720         │
│      │ • Development language of A project                  │
│      │   -Designing in October                              │
│      │   -Programming in November                           │
│      │   -Testing in December                               │
│      │                                                      │
│      │ • Important item                                     │
│      │   -Examination of commercializing plan               │
│      │    (by next meeting)                                 │
│      │ • Next meeting                                       │
│      │   -Sep. 10                                           │
│      └──────────────────────────────────────────────────────┘
└─────────────────────────────────────────────────────────────┘

FIG. 16
```

DOCUMENT MANAGEMENT METHOD AND DOCUMENT MANAGEMENT DEVICE

CROSS-REFERENCE TO RELATED APPLICATIONS

This application is based upon and claims the benefit of priority from the prior Japanese Patent Application No. 2000-333915, filed Oct. 31, 2000, the entire contents of which are incorporated herein by reference.

BACKGROUND OF THE INVENTION

1. Field of the Invention

The present invention relates to a document management method, for managing a renewal history of a document that can be owned jointly by plural users via a network, that can be applied to an information exchanging system such as, for example, a mailing list or an electronic bulletin board. The present invention also relate to a document management device using the method.

2. Description of the Related Art

There is an information exchanging system for exchanging information such as opinions (messages) among users of the respective computers by using a mailing list, an electronic bulletin board, and the like among plural computers connected to a predetermined network such as the Internet. This system enables the respective users to have a conversation or discussion on the network and to own the opinions on a certain topic or the history of it jointly with the plural users by notifying the plural users being members of a specific group or unspecified number of users of a new message to, or by replying to an existing message.

The message is the opinion of each user that is exchanged among the respective users of the plural computers connected to the predetermined network in order to, for example, discuss about a specific topic.

In the case where the users edit the documents by discussing with each other while exchanging, for example, a document file (including a Web page, and the like) as an attached file to an electronic mail or while downloading/uploading the document file saved in a specific server by using such an information exchanging system, it has been necessary for the user who edited the document to describe the message on an intention and a concrete description of editing separately from editing of the document, which means it has been necessary to do two separate troublesome works, that are editing of the object document and preparation of the message.

In this manner, the conventional information exchanging system has a drawback that the document editing and the exchange of the opinions (messages) concerning the document editing can not be implemented efficiently.

BRIEF SUMMARY OF THE INVENTION

Here, in the light of the above drawback, the present invention has an object to provide a document management method for efficiently implementing editing/renewal of a document based on discussions and management of a renewal history of the document among users of plural terminal devices (computers) connected to each other via a network, and a document management device using the method.

According to one aspect of the present invention, there is provided a document management method for, concerning the document that can be owned jointly by the respective users of the plural terminal devices via a network, renewing the document by reflecting an editing intention shown by each of the users while managing the renewal history of the document. The method comprises generating a message tree that accepts a message from users using the terminal devices, the message being in reply to the other message in the message tree; editing the document; generating additive message subjected to a change within the document, the additive message being written into the message tree by one of the users who made the change; and generating a bidirectional reference between the additive message and the document.

BRIEF DESCRIPTION OF THE SEVERAL VIEWS OF THE DRAWING

FIG. 10 is a drawing showing an example of a check table used for judging the propriety of a combination of document identification information and a sort of an editing operation;

FIG. 15 is a drawing showing an example of the display screen of the (publishing-purpose) message containing the document operation;

FIG. 16 is a drawing showing an example of a document display screen;

DETAILED DESCRIPTION OF THE INVENTION

Hereinafter, an explanation will be given of an embodiment of the present invention with reference to the figures.

Figure 1:
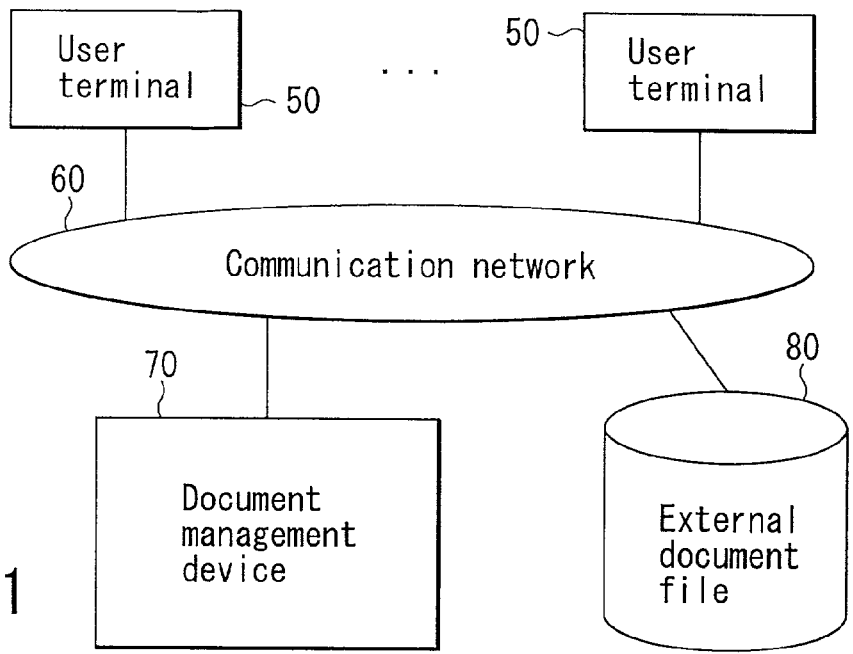
FIG. 1 is a drawing showing an example of a whole structure of an information exchanging system for realizing a document management method in this embodiment.

FIG. 1 shows an example of a whole structure of an information exchanging system for realizing a document management method in the present invention. A user can prepare and edit a document that can be owned jointly by plural users by using a communication network 60 by implementing communication with a computer (it will be referred as a document management device below) 70 as a server device functioning as the document management device via the communication network 60 by using a user terminal 50.

Moreover, for example, a Web page exists as the document that can only be referred to even though it can be owned jointly by the plural users via the communication network 60. The user cannot edit or renew such a document by using the document management device 70 so that such a document will be called external document here (on the other hand, the document that is prepared by using the document management device 70 and can be edited/renewed will occasionally be called internal document). However, even such an external document can be an observation object for the document management device 70. As shown in FIG. 1, it is assumed that a file of the external document (an external document file 80) is stored in the server device composed of a predetermined computer so that it can be accessed from the document management device 70 via the communication network 60. The document management device 70 is designed so as to observe whether or not the designated external document is renewed by a person with an editing authority at the document management device 70. Moreover, the observation-object document is not only the external document, and it may also be the internal document.

Figure 2:
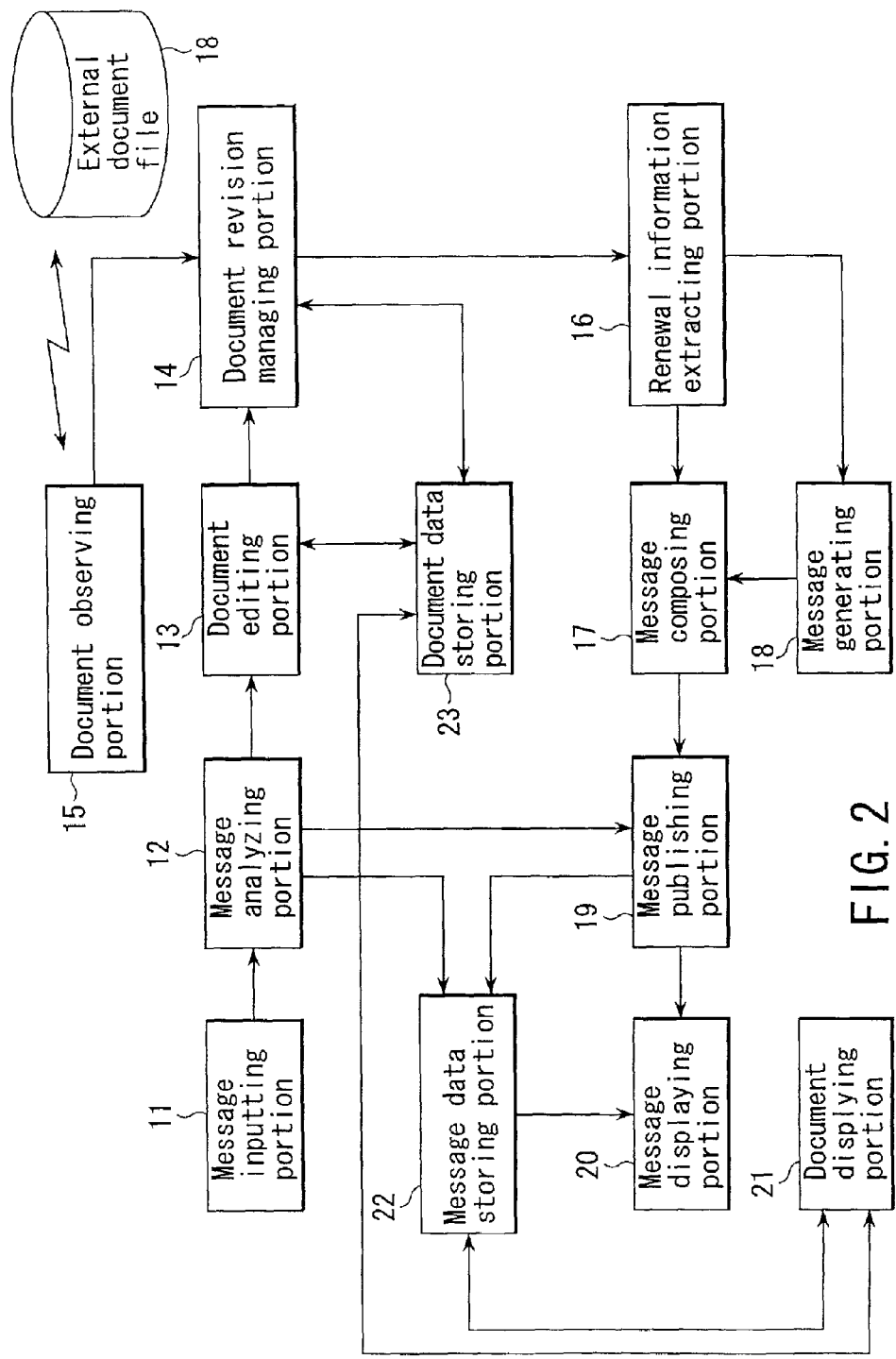
FIG. 2 is a drawing showing a function structural drawing of a document management device in this embodiment.

FIG. 2 shows a function structural drawing of the document management device 70 in this embodiment.

FIG. 2, a message inputting portion 11 is for providing a predetermined input screen to the user terminal 50, and for inputting messages for preparing and editing the document and the messages with only a message body via the input screen. The message prepared by the user includes identification information of the existing message (reference message ID) whose reference is desired besides the message body (if the message is the reply for the existing message), and moreover, when the editing operation of the document is accompanied, the identification information of the editing-object document, the sort of the editing operation, and editing data are included. The sort of the editing operation, the document identification information, and the editing data are put together and called document operation data.

The sort of the editing operation is the predetermined (provided by the document management device 70) operation for the document editing such as, for example, "new preparation", "replacement", "addition", or "deletion", and when the editing operation of the document is implemented, the user selects any one of them on the input screen provided by the message inputting portion 11.

The document identification information is the information composed of symbols and the like for specifying the document that can be owed jointly via the communication network 60, and it is, for example, a sequence of numbers and symbols given with a predetermined rule in the document management device 70, or it may be an URL of a Web page on the Internet, a path name on a file system, and the like.

Editing data is the data to be applied to the editing-object document, and it is composed of the editing data corresponding to the sort of the selected editing operation, that is to say, it is composed of the newly prepared document when the sort of the editing operation is "new preparation", of a replacement position and a replacement sentence when the sort of the editing operation is "replacement", of data to be added to the editing-object document and an addition position when the sort of the editing operation is "addition", and of a deletion position (a deleted sentence may be included) when the sort of the editing operation is "deletion".

A message analyzing portion 12 checks a combination of the sort of the editing operation in the document editing data, the document identification information, and the editing data, and the contents of them when the document editing data is included in the message inputted by the inputting portion 11. The checked document operation data is saved/managed at a message data storing portion 22 while being delivered to a document editing portion 13. Moreover, when the document operation data is not included in the message from the inputting portion 11, the inputted message is delivered to the message publishing portion 19 as it is as the publishing-purpose message.

Besides, "publish" here means writing-in the publishing-purpose message to the message data storing portion 22 so that the message can be accessed (can be referred to) by the user terminals 50 of the users being members of a group or the user terminals 50 of the unspecified number of users in a similar manner to, for example, writing-in messages on a bulletin board like an electronic bulletin board.

In the document editing portion 13, the editing operation by using the editing data is implemented for the document designated by the document identification information (for example, the latest document stored by the document data storing portion 23 at the present) on the basis of the document operation data. For example, when the document identification information has not designated, and the sort of the editing operation is "new preparation", the document identification information is newly issued on the basis of a predetermined rule. When the document identification information is designated, and the sort of the editing operation is "replacement", the designated document is edited by replacing the sentence at the replacement position included in the editing data with the replacement sentence included in the editing data in the same manner. When the document identification information is designated, and the sort of the editing operation is "addition", the designated document is edited by adding the additional sentence included in the editing data in the same manner to the addition position included in the editing data. When the document identification information is designated, and the sort of the editing operation is "deletion", the designated document is edited by deleting the sentence to be deleted from the deletion position included in the editing data.

The document revision managing portion 14 is started-up from the document editing portion 13 after editing the document at the document editing portion 13, and prepares new additional document revision information corresponding to the document identification information designated during start-up. That is to say, by giving a revision number indicating how many times editing is implemented to the edited document (for example, the revision number is "3" if the document is edited three times, and the revision number is "0" if the document is newly prepared) to the document edited at the document editing portion 13, and by saving the edited document and an editing time by preparing the document file with the latest revision number in, for example, the folder corresponding to the document identification information that is prepared in the document data storing portion 23, new additional document revision information is prepared. Moreover, the document observing portion 15 is started-up when the renewal of the observation-object document (including the external document) is detected, and it prepares new additional document revision information corresponding to the document identification information designated during the start-up. That is to say, the revision number indicating how many times the renewal is implemented to the renewed observation-object document is given to the renewed observation-object document, the document file with the latest revision number is made as the document revision information in the folder corresponding to the document identification information prepared in, for example, the document data storing portion 23, and the renewed observation-object document is copied in the file while being saved with the time.

In the document observing portion 15, concerning the document (including the external document) of the document identification information designated by the message prepared by the user as the observation object, the observation-object document is accessed at regular or irregular bases, and the present contents of the document are compared with the contents of the document of the latest document revision information (the document with the greatest revision number) stored in the document data storing portion 23 obtained via the document revision managing portion 14. When a difference is detected (the renewal is detected), the document observing portion 15 forces the document revision managing portion 14 prepare the latest revision information of the observation-object document.

The renewal information extracting portion 16 is started-up after the document revision managing portion 14 prepares the document revision information, and extracts the renewal information composed of differential data between the latest document (including the external document) stored in the document data storing portion 23 and the previous document and the sort of the document operation (new preparation, addition, revision, deletion, and the like similarly to the sort of the editing operation) from the document revision information delivered during the start-up (the document revision information with the latest revision number and the document revision information with the second latest revision number). For the extraction of the differential data, it is effective to use a differential detecting program in a line unit or a letter unit such as, for example, a diff command of the UNIX.

The message generating portion 18 generates a message body on the basis of the renewal information of the observation-object document extracted at the renewal information extracting portion 16 when the renewal of the observation-object document is detected by the document observing portion 15 while requesting the reference message ID, and then, delivers the generated message body and reference message ID to a message composing portion 17.

The message composing portion 17 composes the message body and the reference message ID inputted at the message inputting portion 11, the message body and the reference message ID generated at the message generating portion 18, the document identification information, the renewal information, and the like, and prepares the publishing-purpose message.

The message publishing portion 19 issues the message ID for the publishing-purpose message, and saves/manages the publishing-purpose message and the message ID, and moreover, when the editing-object document exists, saves/manages its document identification information by corresponding the revision number of the document renewed by the message or the revision number and the like of the document wherein the publishing-purpose message is generated when the renewal of the document is detected in the message data storing portion 22 while managing a series of groups of messages linked by a replying relation by the reference message ID in the publishing-purpose message as a message tree. In this case, there is taken a tree structure where the message without the message ID is regarded as a "root" in principle.

The message displaying portion 20 displays the publishing-purpose message designated by the message ID and the message tree including the publishing-purpose message on the user terminal 50.

The document displaying portion 21 displays the document of the document identification information designated by the user terminal 50. At this time, access information of the message is also displayed so that the message (the publishing-purpose message) that implements the editing operation to the document can also be referred to.

In the message data storing portion 22, the message (including the message body, the document operation data, and the like) inputted by the message inputting portion 11, the publishing-purpose message, and the like are stored.

The document data storing portion 23 stores all the document revision information of the document identification information corresponding to the document identification information.

Figure 3:
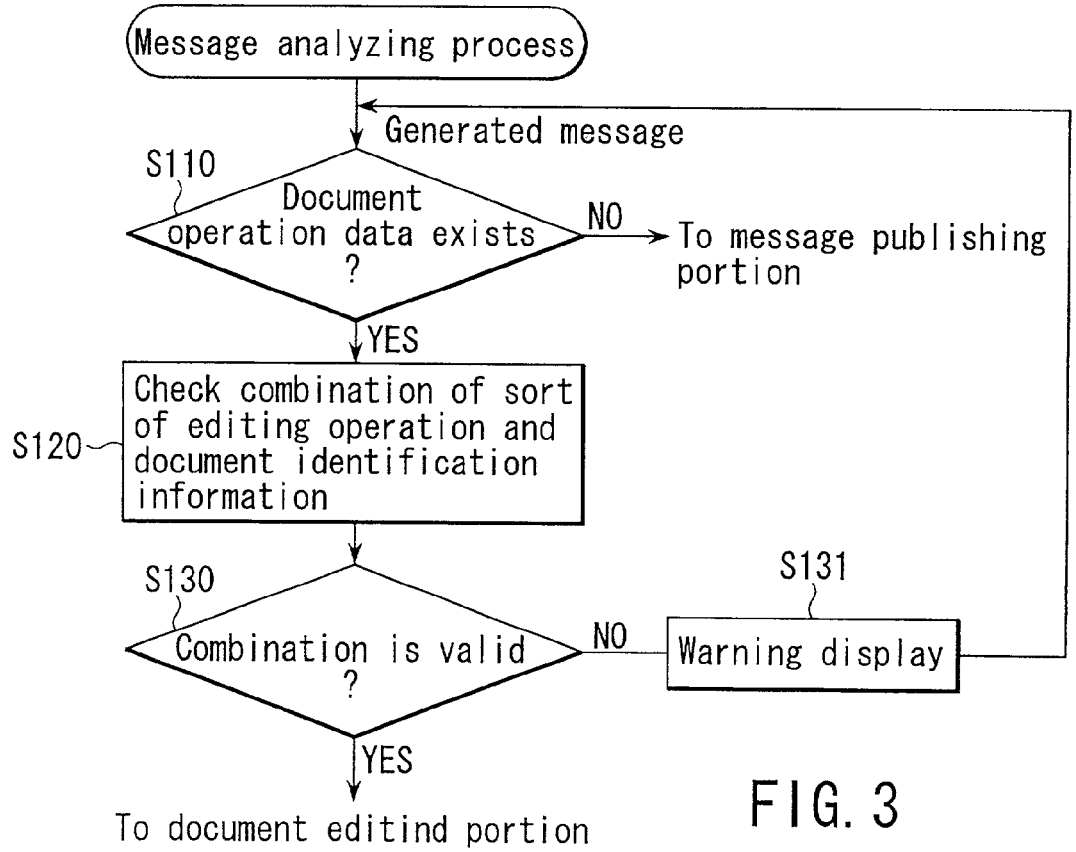
FIG. 3 is a flowchart for explaining a processing operation of a message analyzing portion.

Next, an explanation will be given of the processing operation of the message analyzing portion 12 in FIG. 2 with reference to the flowchart shown in FIG. 3.

At first, the message data inputted by the message inputting portion 11 judges whether or not a designation of the sort of the editing operation exists in the document operation data at a step S110, and if not, the message only includes the message body or the message body and the reference message ID so that the message is delivered to the message publishing portion 19 as the publishing-purpose message.

On the other hand, in the case where the designation of the sort of the editing operation exists, a combination of the sort of the editing operation and the document identification information are collated with the check table at a step S120. The check table in FIG. 10 is possible as an example here. An explanation will be given of FIG. 10 later.

Next, in the case where it becomes clear that the combination is valid at a step S130, the document operation data is delivered to the document editing portion 13, and in the case where it is invalid, a step S131 is implemented so that a warning is displayed and the message inputting portion 11 prompts re-input to the user.

Figure 4:
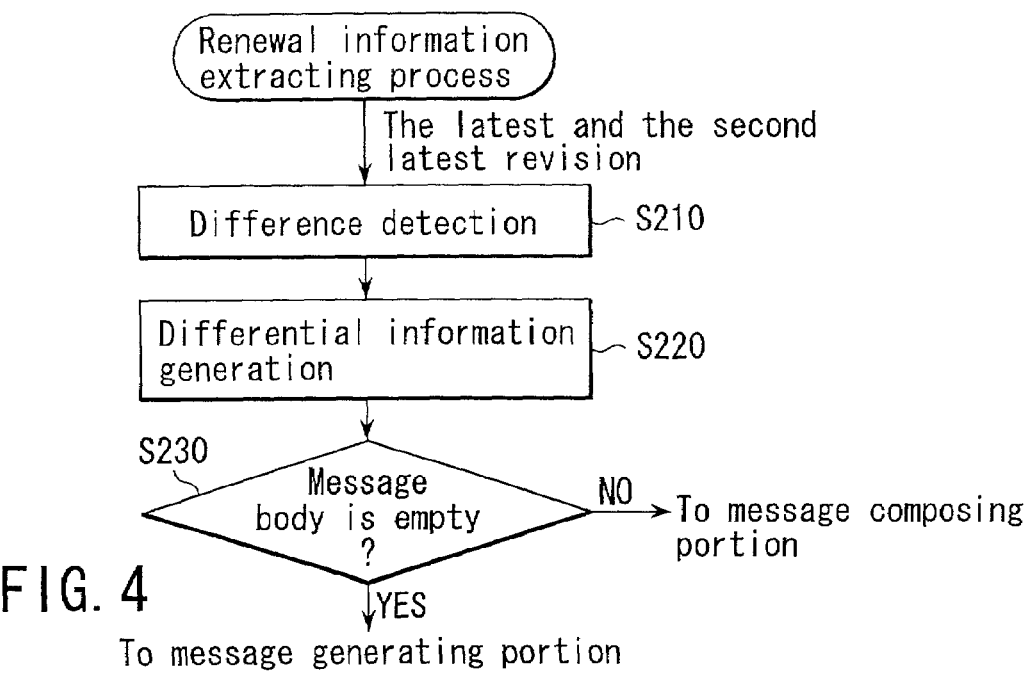
FIG. 4 is a flowchart for explaining a processing operation of a renewal information extracting portion.

Next, an explanation will be given of the processing operation of the renewal information extracting portion 16 in FIG. 2 with reference to the flowchart shown in FIG. 4.

When the document revision information with the latest revision number and the document revision information with the second latest revision number are obtained from the document revision managing portion 14, the difference between the documents with those two revision numbers is detected at a step S210. At a step S220, the sort of the document operation indicating which part of the document had what kind of change is judged in accordance with the detected differential data, and the differential information composed of the differential data and the determined sort of the document operation is generated. For example, although the sort of the editing operation (any one of new preparation, addition, replacement, and deletion) and the editing data in the document operation data may be adopted as the differential information when the document operation data exists, the sort of the document operation is determined by comparing the documents before and after with each other when the document operation data does not exist or the document is the external document. Besides, even when the sort of the editing operation is "replacement", the difference between the document with the latest revision number and the document with the second latest revision number is detected in accordance with the document revision information of the two revision numbers.

Next, when the message body is empty at a step S230, the process at the message generating portion 18 is implemented, and when the message body prepared by the user exists, the process at the message composing portion 17 is implemented.

Figure 5:
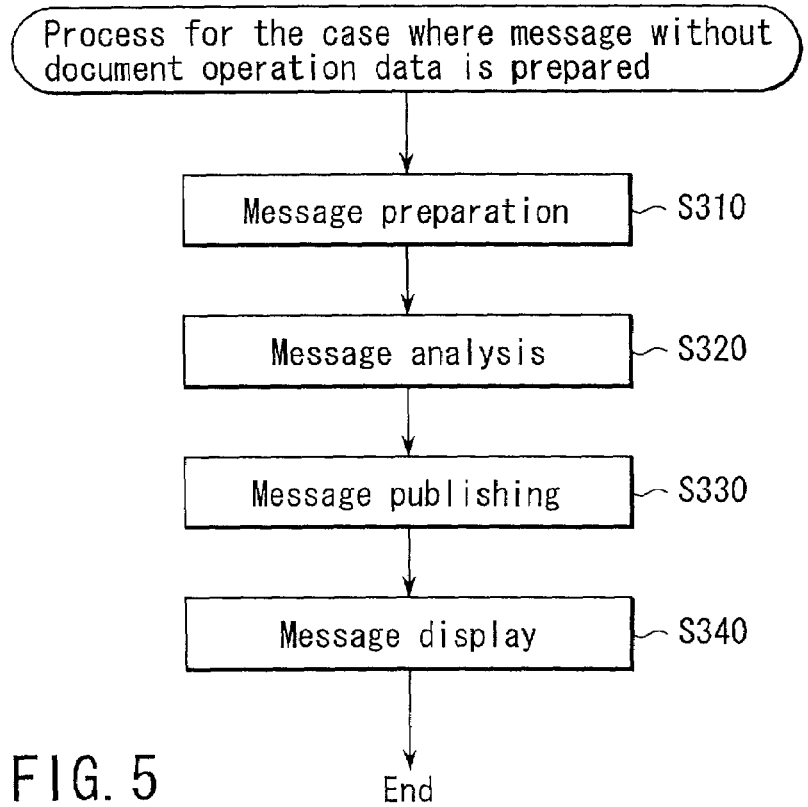
FIG. 5 is a flowchart for explaining a processing operation of the case where a message without document operation data is prepared.

Next, an explanation will be given of a summary of the processing operation of the case where the message without the document operation data is prepared (the processing operation from message preparation to message display) with reference to the flowchart shown in FIG. 5. This is similar to a flow of the processes from the new and reply message preparation to the display thereof in the information exchanging system such as a mailing list. At first, the message prepared by the user from the user terminal 50 is inputted to the message inputting portion 11 at a step S310, and if it is judged that the message does not have the document operation data at the message analyzing portion 12 at a step S320, the process at the message publishing portion 19 at a step S330 is implemented so that the message ID is given as the publishing-purpose message with only the message body or composed of the message body and the reference message ID while the message is stored in the message data storing portion 22. At a step S340, the publishing-purpose message is displayed at the request by the user.

Next, an explanation will be given of the processing operation of the case where the document is edited from the message, which is also the point of the present invention, with reference to the flowchart shown in FIG. 6 and FIG. 8.

Figure 8:
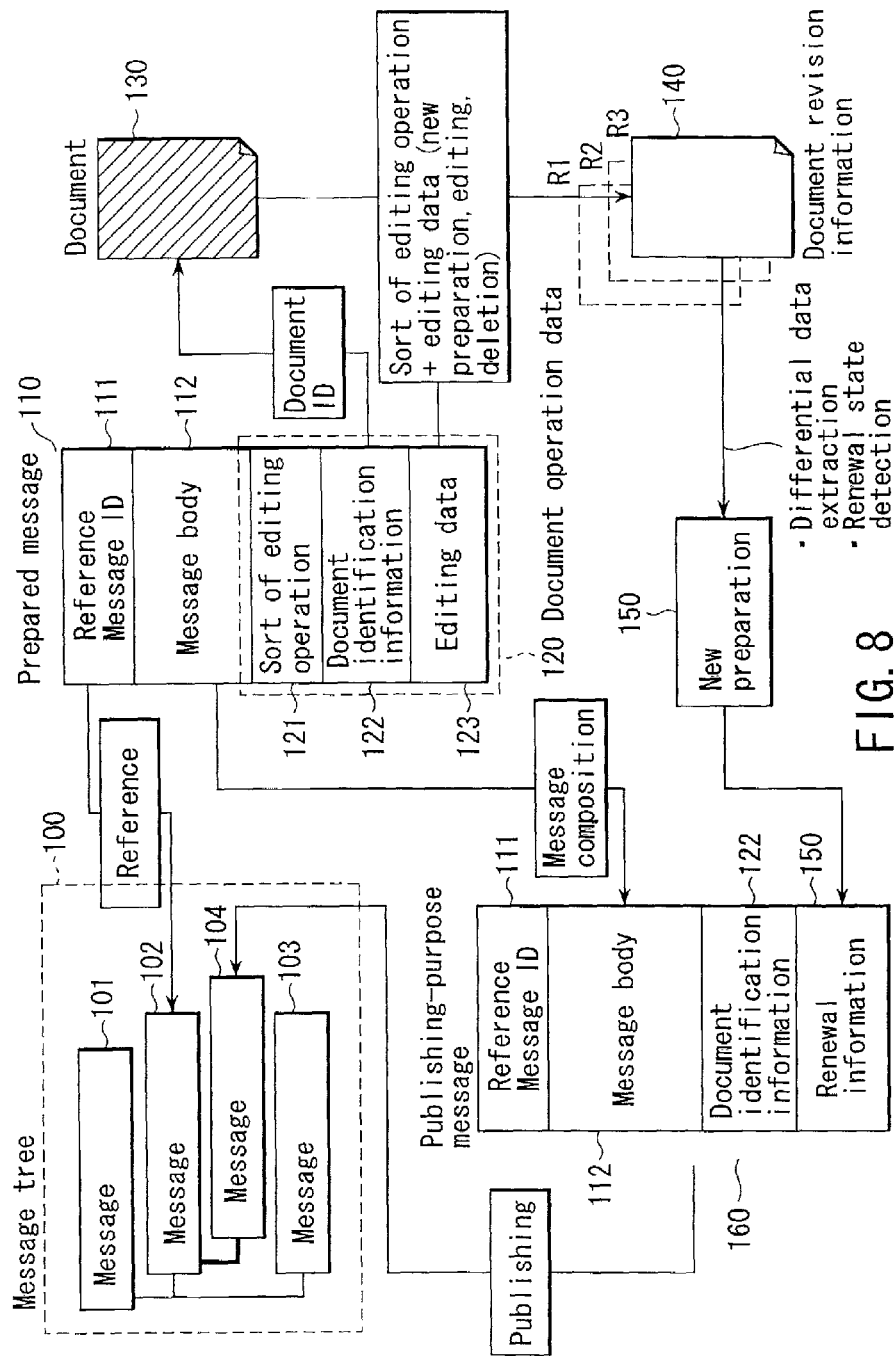
FIG. 8 is a drawing for explaining the processing operation of the case where the message containing the document operation data is prepared.

In FIG. 8, the message tree 100 indicates a part of the message tree of the messages (the publishing-purpose messages identified by the message ID) that is being exchanged among the users being the members of a specific group (community) who can join the conversation about a specific topic. Here, the message tree means a series of message groups linked by a reply relation. The message tree has a tree structure in which the message at a replied side is a parent node and the message at a replying side is a child node. The reference message ID held by a certain message indicates an ID of the original message that the message replies to. For example, the message 102 is the reply for the message 101 in the message tree 100, and the reference message ID held by the message 102 is the same as the message ID of the message 101.

Here, it is assumed that only three messages 101, 102, and 103 exist in the message tree 100, and a consideration will be given of the case where a new message is prepared as the reply message for the message 102.

Figure 6:
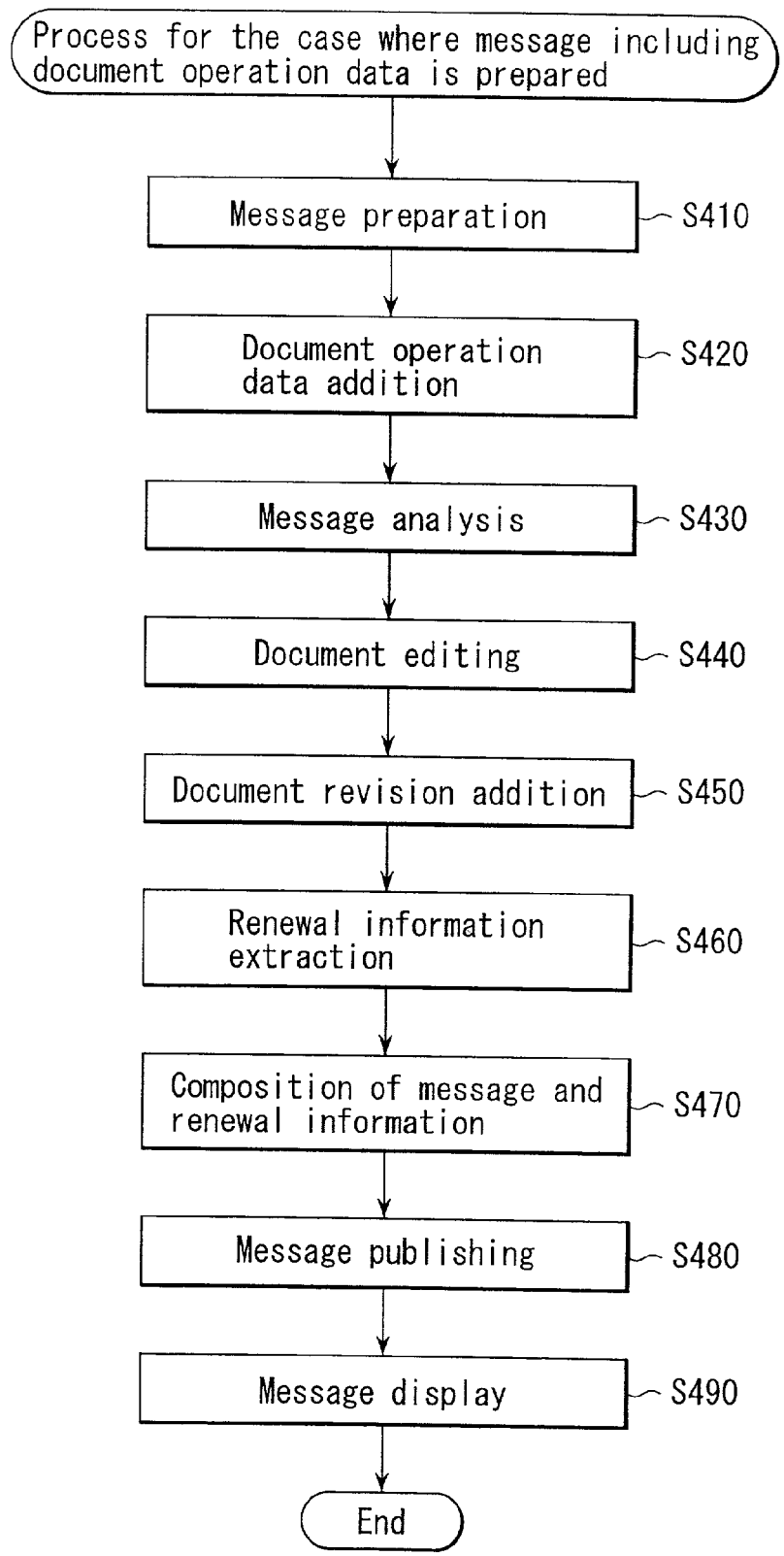
FIG. 6 is a flowchart for explaining a processing operation of the case where a message containing the document operation data is prepared.

At first, the user prepares the message from the user terminal 50, that is to say, the user prepares the message body and designates the reference message ID at a step S410 in FIG. 6, and adds the document operation data at a following step S420. The message prepared in this manner corresponds to a prepared message 110 in FIG. 8.

At a step S430 in FIG. 6, the prepared message 110 is analyzed at the message analyzing portion 12, and matching check of the document operation data, and the like is implemented to check whether or not the reference message ID exists.

In FIG. 8, the reference message ID in the prepared message 110 designates the message 102, and moreover, the prepared message 110 is composed of the message body 112 and the document operation data 120. The document operation data 120 is composed of the sort of the editing operation 121, the document identification information 122, and the editing data 123. The sort of the editing operation is selected by the user from the predetermined sorts of the editing operations such as "new preparation", "replacement", "addition", or "deletion". When "new preparation" is selected, it is unnecessary to clearly indicate the document identification information, and the system gives new document identification information on the basis of a predetermined rule.

At a step S440 in FIG. 6, the document editing portion 13 actually implements the document editing on the basis of the given document operation data. In FIG. 8, the editing data 123 and the sort of the editing operation 121 given by the document operation data are applied to the document 130 designated by the document identification information in the prepared message 110.

Next, at a step S450, the document revision managing portion 14 additionally prepares the latest document revision information of the document corresponding to the document identification information 122. That is to say, in FIG. 8, the document edited at the document editing portion 13 is saved in the document data storing portion 23 as the document revision information 140 to which a new revision number (here, for example, it is edited three times (the revision number "3") so that it is indicated as "R3") is given.

Moreover, at a step S460, the renewal information is extracted by comparing the contents of the document with the latest revision number and the document with the second latest revision number among the documents designated by the document identification information in the renewal information extracting portion 16.

In FIG. 8, obtaining the document data of before and after editing from the document revision information 140 of the "R3" and the document revision information of the "R2", and comparing the data to each other correspond to obtaining the renewal information 150.

The renewal information is the information composed of a sentence indicating a renewal point and the sort of the document operation (renewal situation) such as, for example, "a part below is added to a part of the document", and in this case, a part of the sentence that is actually added.

At a step S470 in FIG. 6, the publishing-purpose message is prepared by composing at least the message body and the renewal information. In FIG. 8, it corresponds to preparation of the publishing-purpose message 160 composed of the reference message ID 111 and the message body 112 in the prepared message 110, and the document identification information 122 and the renewal information 150.

At a step S480, the message ID is given to the publishing-purpose message 160 at the message publishing portion 19, and the message is stored in the message data storing portion 22 as the message corresponding to the message 104 being the child node of the message 102 on the message tree 100 in FIG. 8.

At last, at a step S490, the message 104 is displayed as one of the message groups whose reply relations are managed in the message tree 100 in FIG. 8 at the request from the user.

Next, an explanation will be given of an observation processing operation of the document, which is also the point of this invention, with reference to the flowchart shown in FIG. 7 and FIG. 9.

Figure 7:
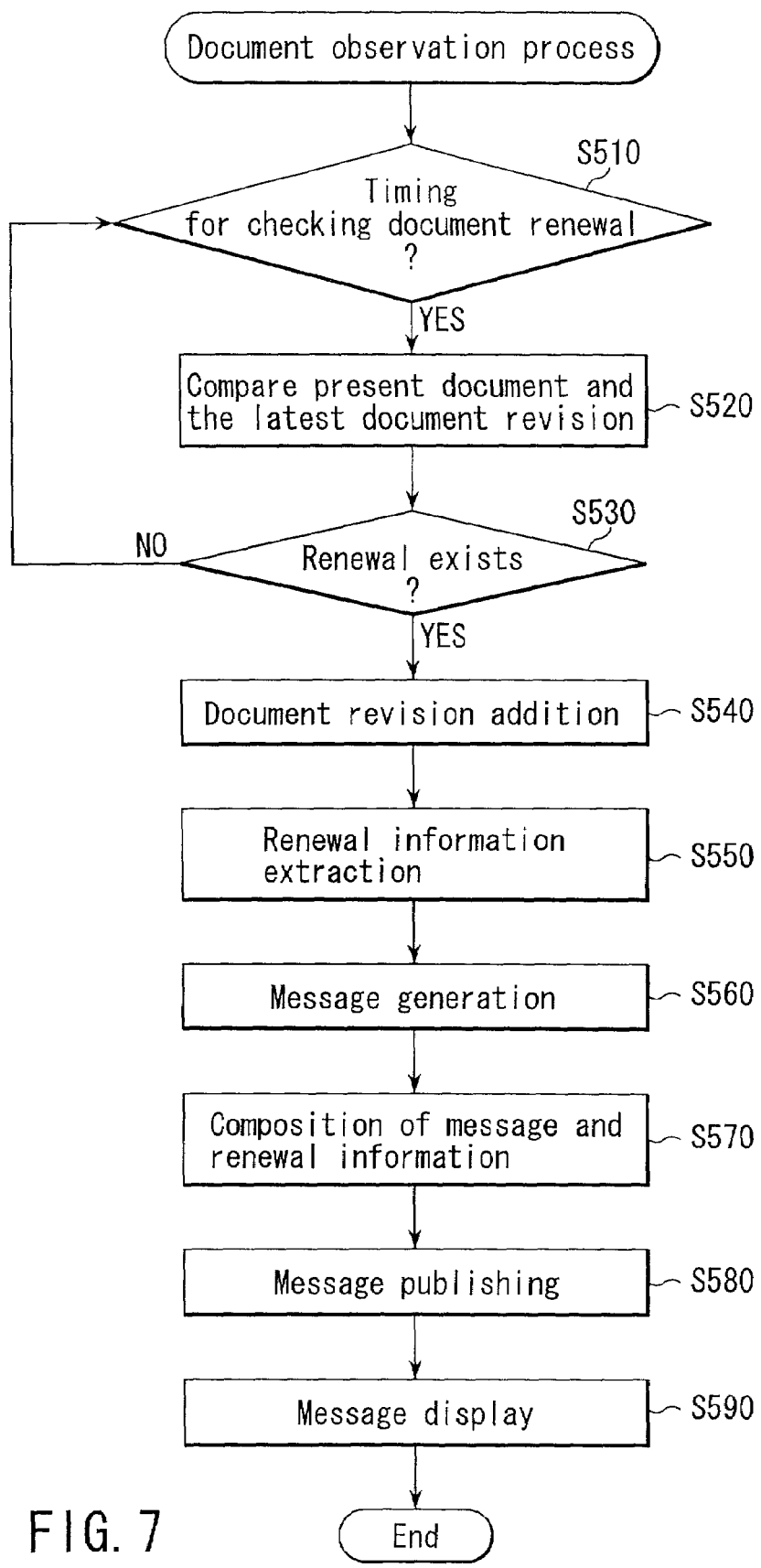
FIG. 7 is a flowchart for explaining an observation processing operation of a document.

At a step S510 in FIG. 7, the document observing portion 15 judges whether or not the present time is timing for checking the document renewal of the document (including the external document). Concerning the document being an object of the document observation, its document renewal is checked in regular or irregular basis (for example, when the user instructs it). In FIG. 9, it is indicated that the document 230 indicated by the document identification information 213 designated by the existing prepared message 201 that is prepared in the past and is stored in the message data storing portion 22 is observed by the document editing management device 70.

Next, at a step S520, the document observing portion 15 compares the present contents of the observation-object document with the contents of the document with the latest revision number among the observation-object documents stored in the document data storing portion 23. This corresponds to comparing the contents of the document 230 with the document revision information 240 with the latest revision number ("R2") of the document 230 stored until then in FIG. 9.

At a step S530, there is judged whether or not the difference exists between the present contents of the observation-object document 230 and the observation-object document with the latest revision number, and if the difference exists, a step S540 is implemented and the latest document revision information of the observation-object document is added at the document revision managing portion 14. In FIG. 9, this corresponds to saving the present contents of the observation-object document 230 in the document data storing portion 23 as the document revision information 241 with the latest revision number ("R3"). When the revision number is renewed, the renewal information 250 is generated from the difference between the new and old ("R2" and "R3") document revision information at the renewal information extracting portion 16 at a step S550.

Next, the message generating portion 18 generates the reference message ID 251 and the message body 252 from the renewal information 250 at a step S560. When the reference message ID is generated, there is used as the reference message the latest message (the message 202 in the message tree 200 in FIG. 9) that is used or prepared when, for example, the document 230 is most recently edited or renewed in the message tree in which the document 230 is the editing/observation object. Moreover, there are used for the generated message body, for example, the document identification information, the title of the document, a person who renewed the document, and the extracted sentence such as "addition", "revision", "deletion" in the renewal information 250.

Next, the message composing portion 17 composes the publishing-purpose message from the message body, the renewal information, and the like at a step S570. In FIG. 9, the publishing-purpose message 260 is composed by using the document identification information 213, the reference message ID 251, the message body 252, and the renewal information 250 in the existing prepared message 201, and this corresponds to generating the message 204 in the message tree 200.

Figure 9:
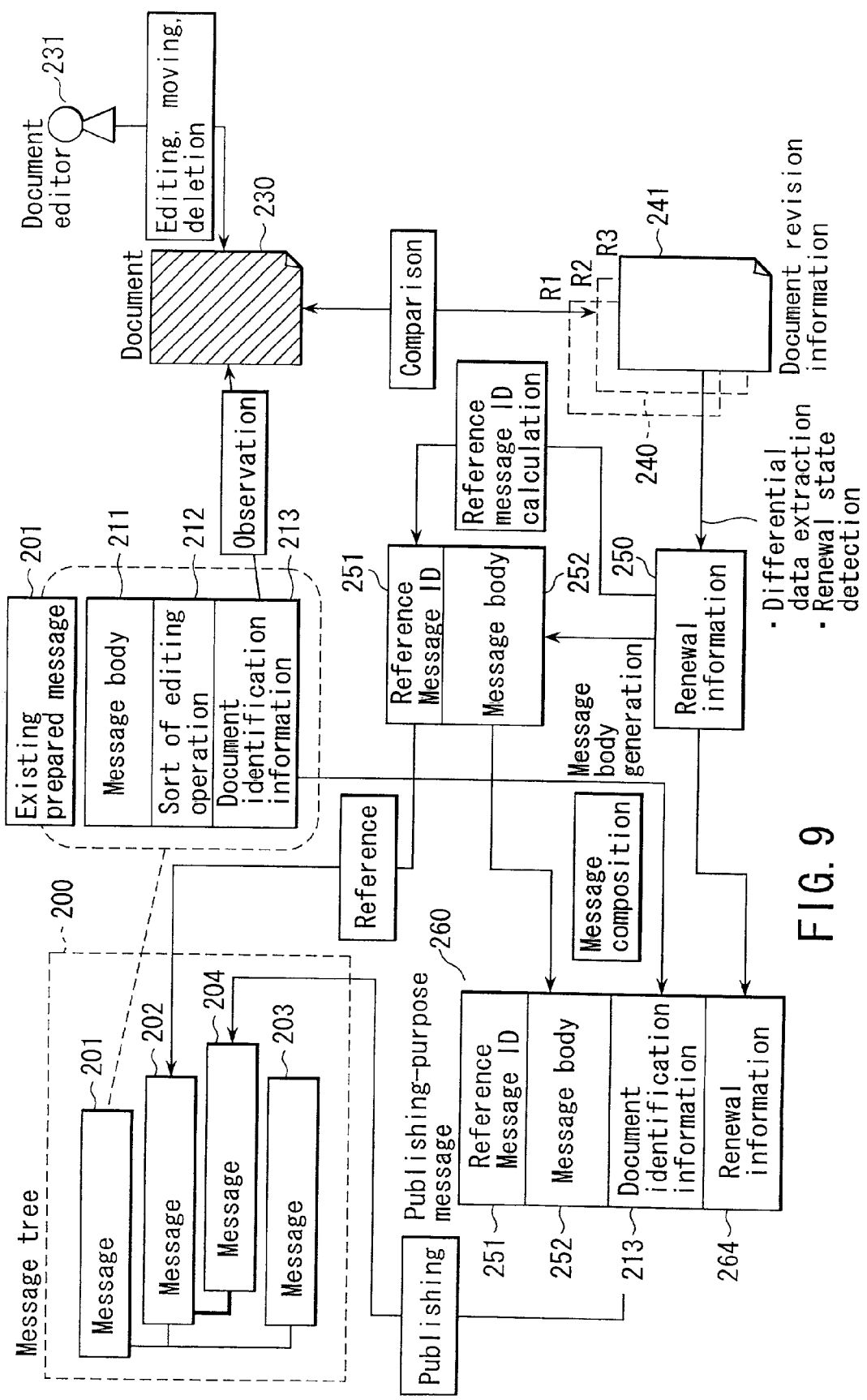
FIG. 9 is a drawing for explaining the observation processing operation of the document.

At a step S580, the message publishing portion 19 gives the message ID to the publishing-purpose message 260, and stores the message to the message data storing portion 22 as the message corresponding to the message 204 being the child node of the message 202 in the message tree 200 in FIG. 9.

At last, at a step S590, the message 204 is displayed as one of the message groups whose reply relations are managed at the message tree 200 in FIG. 9 at the request from the user.

FIG. 10 shows an example of the check table used for judging the propriety of the combination of the document identification information and the sort of the editing operation at the message analyzing portion 12.

As the document identification information, for example, a URL of the Web page on the Internet can be given besides the ones to which numbers are given on the basis of the predetermined rule in the document editing management device 70. In the case of the external document to which such a URL is given, when the document cannot be edited from the document editing management device 70, only the document observation is made valid and the operations such as replacing or adding the document contents become invalid.

According to the check table in FIG. 10, when the sort of the editing operation is "new preparation", the operation is valid only when the designation of the document identification information does no exist, or when there is designated the same document identification information as that of the document being the editing/observation object in the message tree that is not the message tree that can be identified by the reference message ID included in the prepared message or the document existing as the external document, and especially in the second case, when the external document that cannot be edited from the document editing management device 70 is designated, this means starting the observation of the document by the document observing portion 15. Moreover, when the sort of the editing operation is "replacement" or "addition", the operation is valid only when the document identification information of the document being the editing/observation object in the message tree that can be identified by the reference message ID included in the prepared message is designated. Moreover, when the sort of the editing operation is "deletion", the operation is valid only when the document identification information of the document being the editing/observation object in the message tree that can be identified by the reference message ID included in the prepared message or the other message tree is designated, and especially in the second case, the external document that cannot be edited from the document editing management device 70 is designated, this means suspending the observation of the document by the document observing portion 15.

Figure 11:
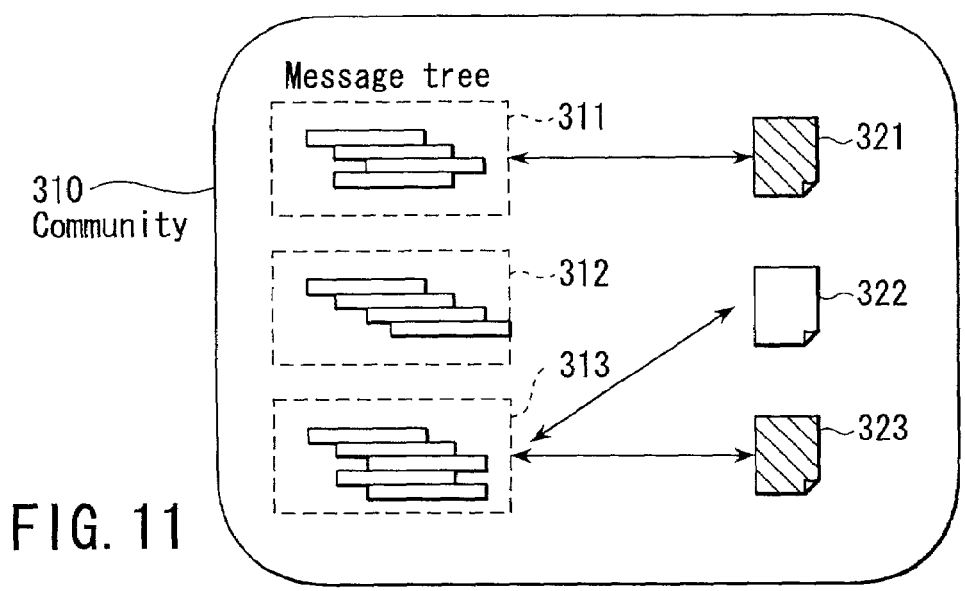
FIG. 11 is a drawing for explaining a correspondence relation between the document and a message tree.

FIG. 11 shows a correspondence relation between the document and the message tree. It is assumed that three message trees 311, 312, and 313 are prepared by exchanging the messages among the users being the members of a specific group (community). In the case of the message tree 311, only the document 321 is the editing/observation object, and in the case of the message tree 312, the document being the editing/observation object does not exist and it is composed only by exchanging the message bodies only. Moreover, in the message tree 313, two documents 323 and 322 are editing/observation object. Not only the cases above, there is also possible the cases where, for example, the document 321 being the editing/observation object in the other message tree 311 is further made to be the editing/observation object of the message tree 313.

Although the designated document is made to be the editing/observation object in the message tree by designating the document identification information in each message composing the message tree, there is a possibility that the management of the history of the editing/renewal of the document by the message tree or the flow of the discussion by the message bodies becomes complicated if the above operation is allowed unlimitedly. Here, by previously making a limitation that up to one document (as the observation object or the editing object) corresponds to each message tree, the management of the history of the editing/renewal of the document by the message tree or the flow of the discussion by the message bodies can be made clear.

Next, an explanation will be given of a structuring method of the message tree in the message publishing portion 19. As is described above, there are the cases where the document is edited/renewed by the message, and the cases where the document is directly renewed without the message and the message corresponding to the renewal is prepared by the document observation afterwards. Moreover, the message with only the message body without the editing operation of the document also exists.

Figure 12A:
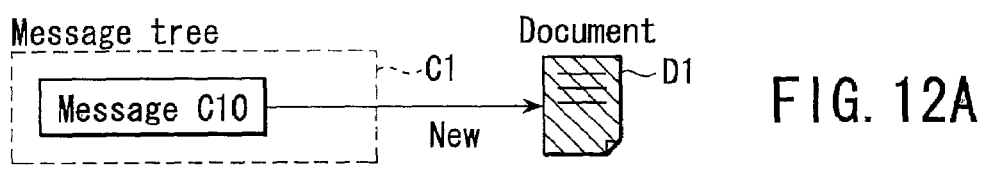
FIG. 12A is a drawing for explaining an example of a structuring method of the message tree.
Figure 12B:
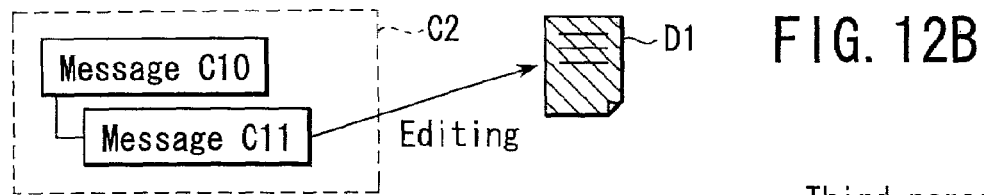
FIG. 12B is a drawing for explaining another example of the structuring method of the message tree.
Figure 12C:
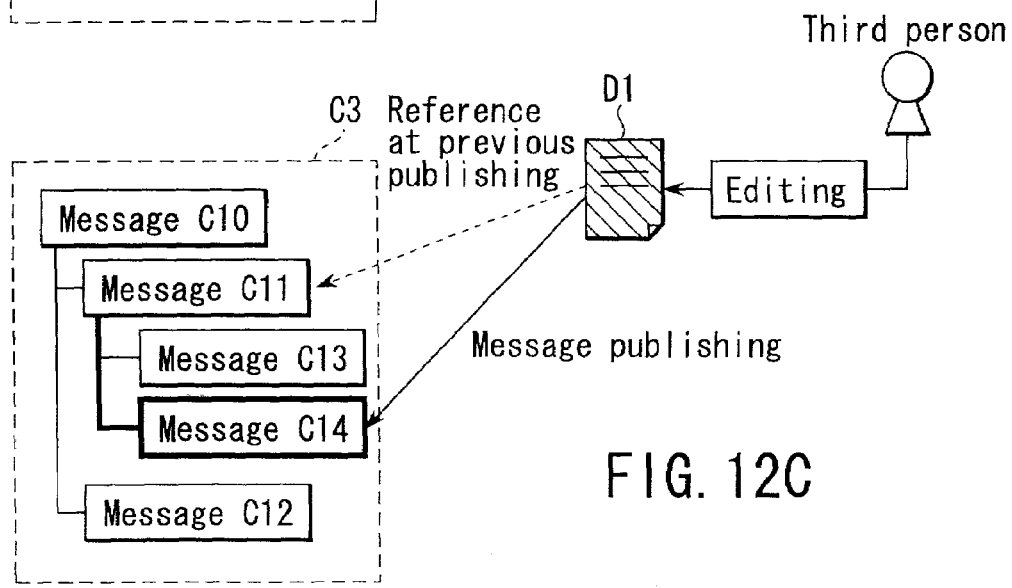
FIG. 12C is a drawing for explaining still another example of the structuring method of the message tree.

That is to say, as shown in FIG. 12A, a message tree C1 is newly prepared in the case where a document D1 is newly prepared by preparing a message C10. Moreover, as shown in FIG. 12B, in the case where the document D1 is edited by the message C11 after preparing the message C11 (with the message ID of the message C10 as the reference message ID) as the reply for the existing message C10, the message C11 is made to be the child node linked to the message C11. Moreover, as shown in FIG. 12C, in the case where the message C13 does not include the document operation data, and it is the message prepared as the reply for the message C11 (the reference message ID is the message ID of the message C11), the message C11 is made to be the child node linked to the message C11.

In this manner, although the user can determine the message used as the reply, that is to say, the reference message ID when the document is edited from the message, it is necessary that the document editing observation device 70 determines the reference message ID when the message is prepared by the document observation. That is to say, in FIG. 12C, when the document D1 is directly edited by the third person, the renewal is detected at the document observing portion 15, and the reference message ID of the message C14 prepared in the manner shown in FIG. 7 is made to be the message ID of the latest message (for example, the message C11 here) used or prepared when the document D1 is most recently edited or renewed in the message tree in which the document D1 is the editing/observation object during message C14 preparation and the message C14 is made to be the child node linked to the message C11 (made to be the reply to the message C11).

Next, an explanation will be given of a screen display example as a user interface presented to the user terminal 50.

Figure 13:
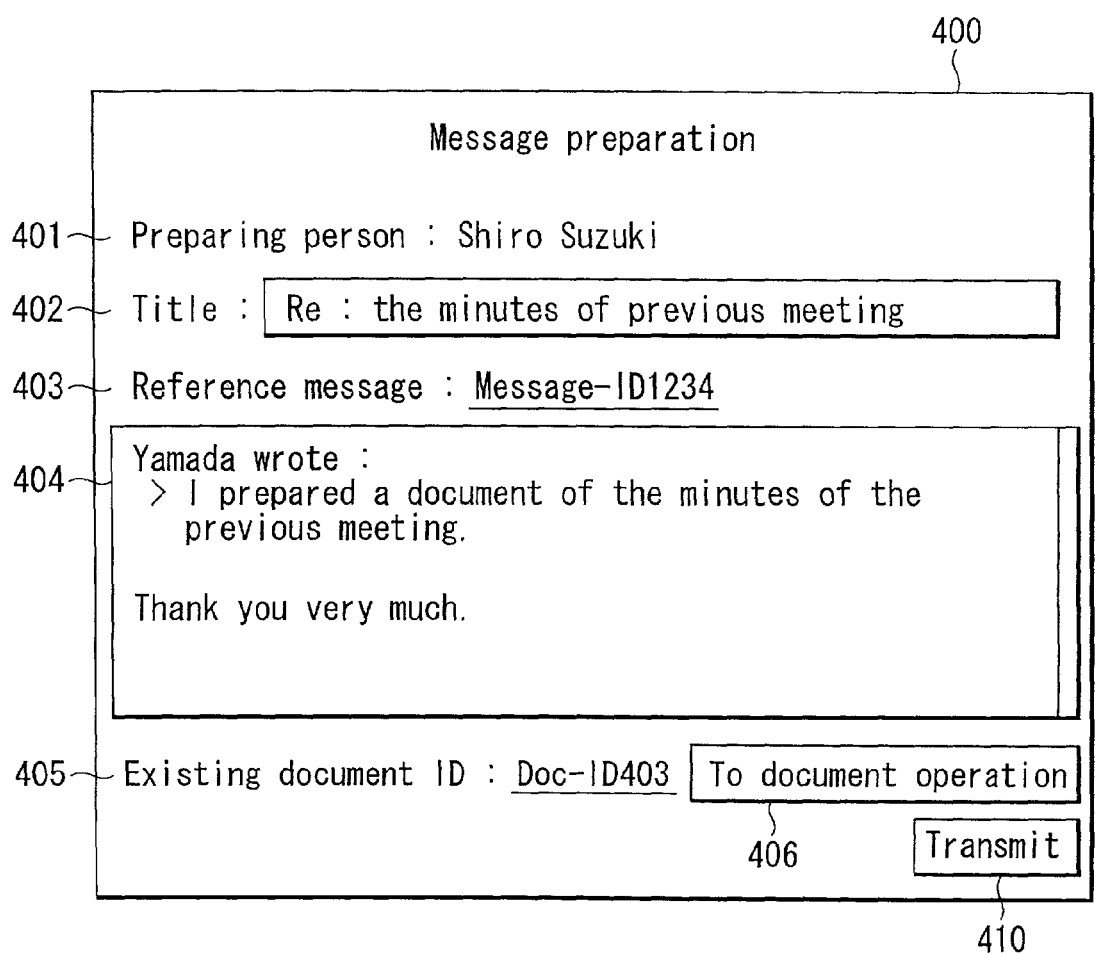
FIG. 13 is a drawing showing a display example of a message preparation screen for preparing a reply message for an existing message (a publishing-purpose message) without the document operation data.

FIG. 13 shows an example of a message preparation screen presented by the message inputting portion 11, and it is particularly a message preparation screen 400 for preparing the reply message for the existing message (the publishing-purpose message) that does not include the document operation data. FIG. 13 shows the state where a title as the replay message, the reference message ID, and the message body are inputted respectively to the input areas 402, 403, and 404, and if a transmission button 410 is pressed under the state, input data of this message preparation screen is inputted to the inputting portion 11 as the prepared message and the processes of the steps after a step S320 in FIG. 5 are implemented.

Figure 14:
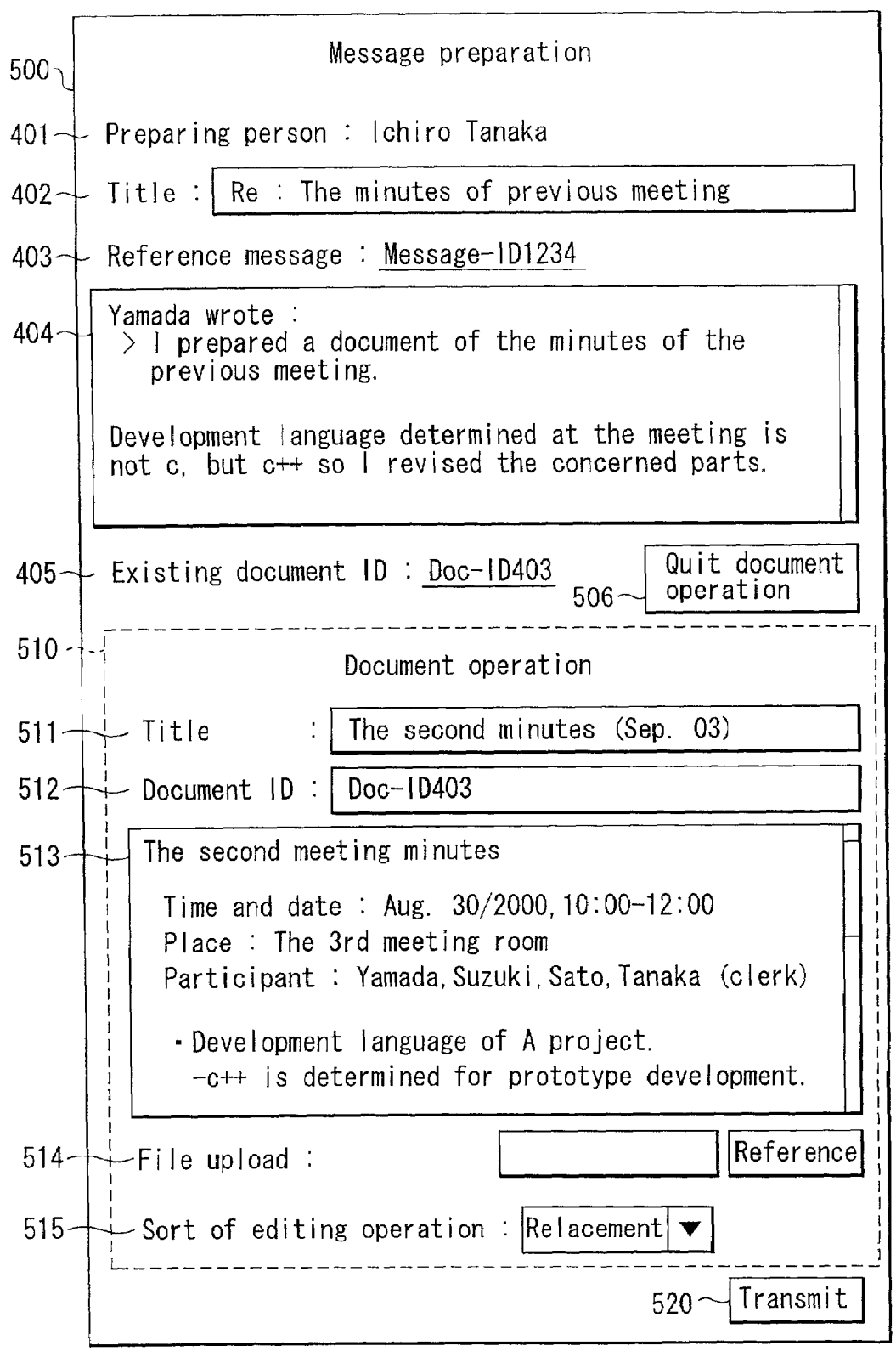
FIG. 14 is a drawing showing a display example of the message preparation screen for preparing the message containing the document operation.

On the other hand, by pressing a button 406 indicating "to the document operation" under the state shown in FIG. 13, the message preparation screen with the document operation data shown in FIG. 14 can be started-up.

FIG. 14 shows the message preparation screen 500 for preparing the message with the document operation. Besides the input to the input areas shown in FIG. 13, the document identification information of the editing-object document, the sort of the editing operation, and the editing data are inputted respectively to the input areas 512, 515, and 513. When the sort of the editing operation is inputted to the input area 515, a table of the sorts of the editing operations ("new preparation", "addition", "replacement", and "deletion") is displayed in a pull-down form, and it is designed so that selected one among them will be displayed on the input area 515.

If the transmission button 520 is pressed after inputting, for example, the reference message ID, the message body, the document identification information of the editing-object document, the sort of the editing operation, and the editing data on the message preparation screen shown in FIG. 14, the inputted data on the message preparation screen is inputted to the inputting portion 11 as the prepared message, and the processes of the steps after a step S430 in FIG. 6 are implemented.

FIG. 15 shows an example of the message display screen displayed on the user terminal 50 at a step S490 in FIG. 6, and shows the display screen 600 of the (publishing-purpose) message with the document operation. In FIG. 15, the message ID of the message that is being displayed, the reference message ID, the message body, the document identification information of the editing-object document, and the renewal information are displayed respectively on the display areas 601, 604, 605, 611, and 613. Particularly on the display area 611, there is displayed the identification information of the newly prepared document revision information (it is the revision number and is indicated as "Rev.2" here) as a result of being edited by the message that is being displayed with the document identification information of the editing-object document. For example, by clicking with a mouse the display area 611 on which the document identification information is displayed, the document display screen shown in FIG. 16 is presented by a document displaying portion 21, and the contents of the document with the displayed revision number are displayed.

In the document display screen 700 shown in FIG. 16, with the document identification information of the document that is being displayed, its revision number (it is indicated as "Rev. 2" here) is displayed on the display area 701, and the contents of the document are displayed on the display area 710.

Besides, the document display screen 700 can be called from the message display screen, and it can also be displayed by designating the document identification information and the revision number.

A characteristic point of the document display screen is that, by designating the desired part (for example, the underlined sentence 720 in FIG. 16) in the document displayed on the display area 710 by user using a mouse and the like, the latest message ID involved in the editing or renewal of the part is displayed on the display area 705 in the case where the part has been edited or renewed in the past, and moreover, the message with the message ID displayed on the display area 705 is displayed in the display screen shown in FIG. 15 by pressing the button 706.

Moreover, the document with the revision number before or after the revision number of the displayed document can be displayed in succession by pressing the predetermined button in the revision selection area 703.

Figure 17:
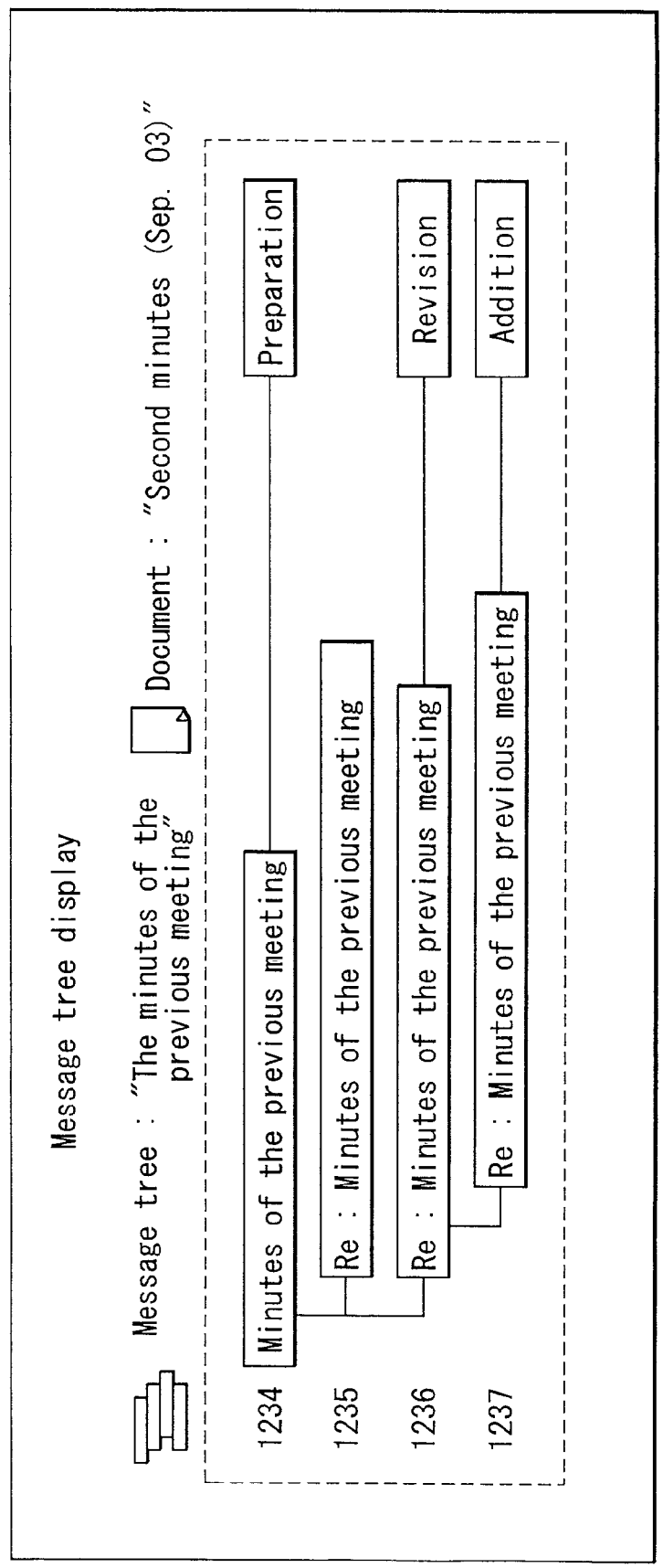
FIG. 17 is a drawing showing a display example of the message tree.

FIG. 17 shows an example of the message tree display screen presented by the message displaying portion 20, and here, it shows a display example of the message tree of the case where one document corresponds to one message tree. As shown in FIG. 17, in the case where the message composing the message tree is accompanied by the editing operation to the editing-object document in the message tree (including the message generated when the renewal of the document by the third person is detected), a letter sequence indicating the sort of the document operation (the sort of the editing operation) or the figure is added to the message and is displayed. Owing to this, the user can clearly understand the flow of the discussion by the messages and the history of the document editing/renewal.

As described above, although plural message groups being in the reply relation with one document are managed and stored in the message tree in the message data storing portion 22 concerning, for example, the renewal of the document, there is also the message tree that is composed of the message groups with only the message bodies that is not related to the document editing at all. It is assumed that, even in such a message tree, any discussion is being progressed in each of the message bodies as long as they are linked to each other by the reply relation. Accordingly, it is profitable to prepare one document by summarizing all of or a part of the message bodies composing one message tree, or to prepare the editing data for the document that the message tree uses as the editing object.

Figure 18:
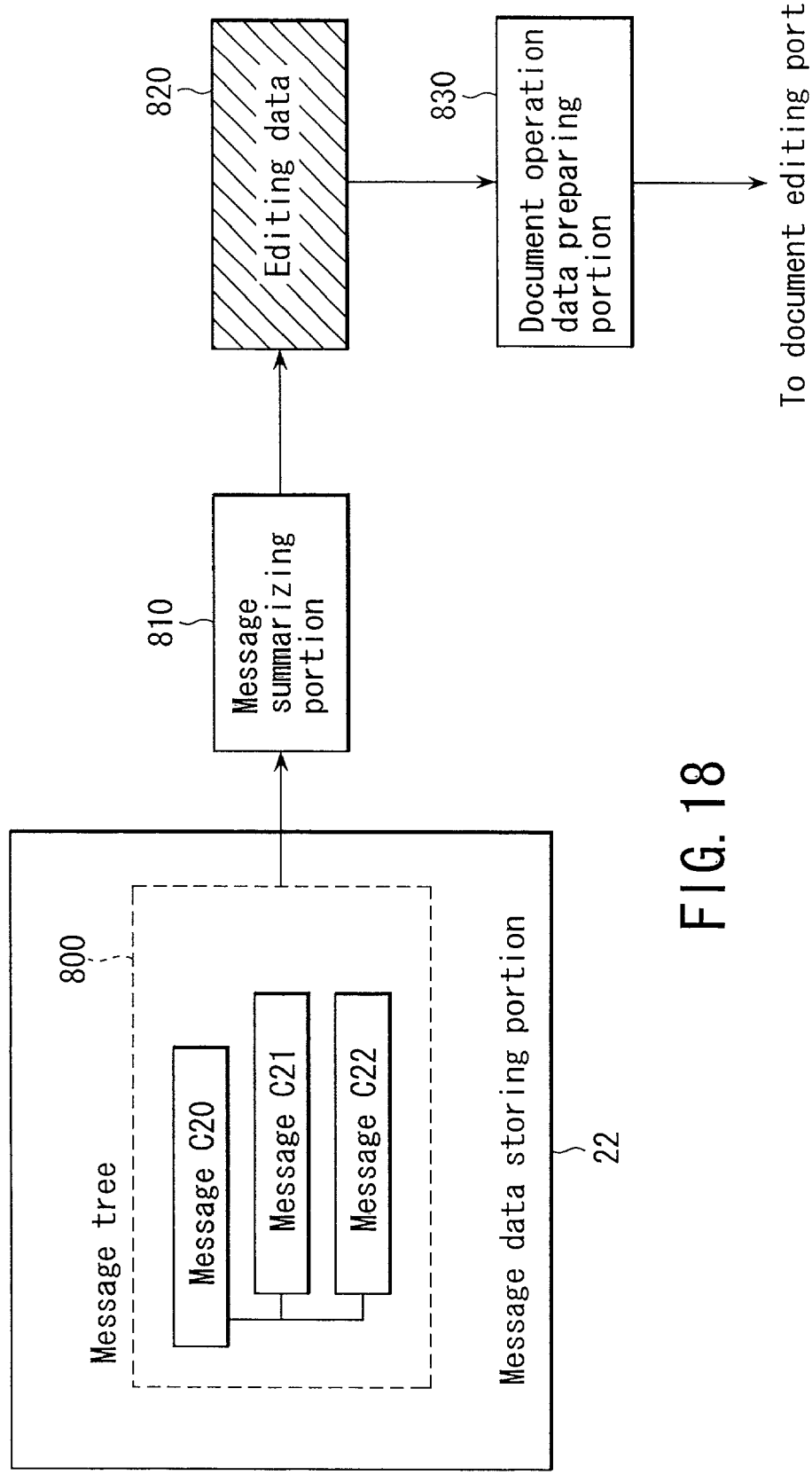
FIG. 18 is a drawing for explaining the structure and the processing operation of the document management device of the case where the document is newly prepared from all of or a part of the messages composing one message tree.

FIG. 18 shows the main part of the structure of the document editing management device in such a case. It is assumed that the message tree 800 with only the message bodies stored in the message data storing portion 22 without, for example, the editing-object document is designated.

The message bodies in the respective (publishing-purpose) messages composing the message tree 800 are inputted to a message summarizing portion 810. In the message summarizing portion 810, the process for gathering plural message bodies into one document is implemented by using the technique disclosed in, for example, Jpn. Pat. Appln. KOKAI Publication No. 2000-112980. The document obtained as a result is delivered to a document editing data preparation portion 830. In the document editing data preparation portion 830, the document delivered by the message summarizing portion 810 is used as the editing data, the document editing data to be delivered to the document editing portion 13 is prepared by giving "new preparation" to the editing data as the sort of the editing operation, and the prepared document editing data is delivered to the document editing portion 13. The processes after this are similar to above.

As explained above, according to the above embodiment, the document editing is implemented at the same time as the message preparation for the document editing, and the renewal contents of the renewed document obtained as the result of editing are displayed with the message sentence so that, when a user edits the document, the user can instructs the editing operation after clearly understanding the renewal history up to the present by referring to the renewal contents relating to the renewal in the past and the message sentence, and editing/renewal of the document after understanding the discussion and the management of the renewal history of the document can be implemented effectively among the plural users via the network.

Besides, in the above embodiment, the document identification information does not necessarily indicate one document so that it is possible that a piece of the document identification information is given to a group of plural documents as an aggregate.

Moreover, the method described in the above embodiment, that is to say, the process of each functional portion shown in FIG. 2 can be distributed as a program that can be implemented by a computer by storing them to recording media such as a DVD, CD-ROM, floppy disk, individual memory, or optical disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document management method for, concerning the document that can be owned jointly by the respective users of the plural terminal devices via a network, renewing the document by reflecting an editing intention shown by each of the users while managing the renewal history of the document, the method comprising:
generating a message tree that accepts a message from users using the terminal devices, the message being in reply to the other message in the message tree;
editing the document;
generating additive message subjected to a change within the document, the additive message being written into the message tree by one of the users who made the change; and
generating a bidirectional reference between the additive message and the document.

2. The message according to claim 1, wherein said editing the document is changed over from editing in the message tree.

3. The method according to claim 1, further comprising:
generating a renewal information based on the change to the document; and
writing the additive message containing the renewal information into the message tree.

4. The method according to claim 3, wherein the additive message containing the renewal information is in reply to a message for the final edition to the document within the message tree.

5. The method according to claim 1, further comprising:
generating an abstract document based on the plurality of massages within the message tree.

6. The method according to claim 1, further comprising:
displaying a first identifier of a first message tree and corresponding first document and second identifier of a second message tree and corresponding second document.

7. The method according to claim 1, further comprising:
monitoring whether the change to the document has occurred;
writing the additive message regarding the monitored change into the message tree to make an attention attracting.

8. A document management apparatus for, concerning the document that can be owned jointly by the respective users of the plural terminal devices via a network, renewing the document by reflecting an editing intention shown by each of the users while managing the renewal history of the document, the apparatus comprising:

a first generating device configured to generate a message tree that accepts a message from users using the terminal devices, the message being in reply to the other message in the message tree;

a document editor;

a second generating device configured to generate additive message subjected to a change within the document by the editor, the additive message being written into the message tree by one of the users who made the change; and a third generating device configured to generate a bidirectional reference between the additive message and the document.

9. The apparatus according to claim 8, wherein said editing the document is changed over from editing in the message tree.

10. The apparatus according to claim 8, further comprising:

a fourth generating device configured to generate a renewal information based on the change to the document; and a writer configured to write the additive message containing the renewal information into the message tree.

11. The apparatus according to claim 10, wherein the additive message containing the renewal information is in reply to a message for the final edition to the document within the message tree.

12. The apparatus according to claim 8, further comprising:

a fifth generating device configured to generate an abstract document based on the plurality of massages within the message tree.

13. The apparatus according to claim 8, further comprising:

a displaying device configured to display a first identifier of a first message tree and corresponding first document and a second identifier of a second message tree and corresponding second document.

14. The apparatus according to claim 8, further comprising:

a monitoring device configured to monitor whether the change to the document has occurred;

a writer configured to write the additive message regarding the monitored change into the message tree to make an attention attracting.

* * * * *